United States Patent [19]

Takahashi et al.

[11] 4,455,569

[45] Jun. 19, 1984

[54] COLOR IMAGING APPARATUS

[75] Inventors: Kenji Takahashi, Kodaira; Shusaku Nagahara, Hachioji; Morishi Izumita, Inagi; Kazuhiro Sato, Tokyo; Toshiyuki Akiyama, Kodaira; Naoki Ozawa, Kokubunji, all of Japan

[73] Assignee: Hitachi, Ltd., Tokyo, Japan

[21] Appl. No.: 337,409

[22] Filed: Jan. 6, 1982

[30] Foreign Application Priority Data

Jan. 28, 1981 [JP] Japan .................................. 56-10236

[51] Int. Cl.$^3$ .......................... H04N 9/09; H04N 9/62
[52] U.S. Cl. .......................................... 358/51; 358/10
[58] Field of Search ........................ 358/51, 50, 41, 10, 358/21 R

[56] References Cited

U.S. PATENT DOCUMENTS

| | | | |
|---|---|---|---|
| 3,692,918 | 9/1972 | Olson | 358/51 |
| 3,700,789 | 10/1972 | Ryley | 358/51 |
| 3,859,460 | 1/1975 | Westell | 358/222 |
| 4,234,890 | 11/1980 | Astle | 358/51 |
| 4,285,004 | 8/1981 | Morrison | 358/51 |
| 4,314,272 | 2/1982 | Miyaji | 358/51 |
| 4,318,124 | 3/1982 | Nakamura | 358/51 |

*Primary Examiner*—Tommy P. Chin
*Attorney, Agent, or Firm*—Antonelli, Terry & Wands

[57] ABSTRACT

A color imaging apparatus having a plurality of image pickup tubes which pick up respective optical images of primary colors separated from one optical image includes a registration control circuit which operates to hold a picture of high quality at all times by controlling the registration of the images of the respective image pickup tubes on a real time basis during the operation of the camera. To this end a circuit detects those local image signals which satisfy predetermined requisites which are most favorable for use as reference signals to control the registration and these detected image signals are temporarily stored so as to be used for the registration operation. The most favorable requisites of the local image areas selected for registration control are (1) those having no movement, (2) those having a contour which is sharp and (3) those having a chroma which is low.

12 Claims, 13 Drawing Figures

COLOR IMAGING APPARATUS

BACKGROUND OF THE INVENTION

This invention relates to color imaging apparatuses, and more particularly to a color imaging apparatus which decomposes a single optical image into a plurality of optical images in primary colors and which picks up the respective images with corresponding image pickup tubes.

Heretofore, in the case of transmitting a picture of high quality as a video signal in a television broadcast service etc., there has been used a system wherein the optical image of an object is decomposed into primary colors and wherein image pickup tubes are disposed in correspondence with the optical images of the respective primary colors. For example, there has been used a three-tube type color imaging apparatus which is provided with three image pickup tubes corresponding to the three primary colors of red (hereinbelow, abbreviated to R), green (abbreviated to G) and blue (abbreviated to B). A four-tube type color imaging apparatus in which an imge pickup tube for obtaining a luminance signal is provided in addition to the three image pickup tubes for obtaining the signals of the primary colors R, G and B, and the like apparatuses have also been known.

As a technique common to these multi-tube type color imaging apparatuses, the so-called registration of images involving the placing of the pictures of the respective image pickup tubes one over another is required. In general, the multi-tube type apparatuses involve various distortions and positional deviations on account of lens aberration, the machining error of a lens-block color-separation system, the machining error of an electron gun in each image pickup tube, the error of a deflection coil assembly, etc. Usually, the distortions and the positional deviations include ones which are electrically corrected by changing the scanning position of an electron beam on the target plane of the image pickup tube, and ones which are corrected by changing the position of the image pickup tube by means of a mechanical adjusting mechanism provided for this purpose. In this regard, once the mechanical adjusting mechanism has been adjusted, it scarcely needs readjustments until the time of replacement of the image pickup tubes. In contrast, the troublesome operations of the electrical adjustments, specifically, the adjustments of the horizontal and vertical positions of the respective image pickup tubes, the adjustments of the horizontal and vertical amplitudes thereof, the adjustments of the horizontal and vertical linearities thereof, skew adjustments, the adjustments of pincushion distortions appearing at the corners of the respective pictures, etc. must be carried out each time the imaging apparatus is set up. Since the adjusting operations are also affected by a temperature rise within the imaging apparatus, they are ordinarily made after executing a heat run by closing a power supply 30 minutes to 1 hour before the use of the imaging apparatus. Accordingly, costs required for the adjustments (personnel expenditure, electric power, time loss) are huge.

In order to avoid such troublesome adjusting operations, there has recently been introduced an automatic setup system which employs a microcomputer.

A concrete example is "Automated Set-Up System For High Sensitive Handy Camera" reported in IEE International Broadcasting Convention IBC 80, Conference Paper No. 191, pp.31-33.

With this imaging apparatus, a special pattern such as a wedge-shaped pattern for affording an adjusting criterion is contained in a taking lens for receiving the optical image of an object, and the misregistrations of the respective image pickup tubes are detected by utilizing the pattern. The adjustments of the registration are made with an auto-presetting registration system wherein the pattern in the taking lens is picked up by the respective image pickup tubes of R, G and B, the positional deviations involved are detected from the time deviations of the resulting output signals, a microcomputer is used to decide which directions the positional deviations may be corrected in, and adjusting circuitry is electrically and automatically controlled.

Although the introduction of the setup method has sharply shortened the setup time, deviations occurring during use after the presetting is completed cannot be corrected. More specifically, this system undergoes misregistrations during the use of the imaging apparatus or camera on account of disturbances after the presetting, specifically, the stability characteristic of each electronic circuit of the camera, the direction of geomagnetism, the change of the zooming ratio of a zoom lens, the mechanical expansion or contraction of an optical system-supporting portion ascribable to the generation of heat by the camera body, etc. In the future, the misregistrations will pose a problem especially in a color camera for a High Definition TV System (having, for example, 1,000–2,000 scanning lines).

SUMMARY OF THE INVENTION

This invention has for its object to solve the disadvantage of the automatic presetting registration as stated above.

The automatic registration of the presetting system in the prior art promises the use of the special criterion pattern contained in the taking lens, so that the image pickup must be stopped during the presetting operation. As already stated, a registration stability under identical presetting conditions over a long time cannot be attached by the adjustments with this system. The present invention has therefore made it possible to perform the automatic registration operation even during the normal imaging of an object. As reference to replace the pattern of the presetting system, it utilizes that local image area of the object which satisfies predetermined conditions. This permits the corrections of misregistrations under the imaging state, and realizes the misregistration corrections matching to conditions during the use of the camera.

Now, description will be made of the conditions of the local image area which serves as the reference of the registration and which is obtained from a video signal in the course of imaging. In order to judge whether or not the image pickup tubes are in registration, it is necessary that signals provided from the respective image pickup tubes have the same picture variation. Since an object of many hues results in providing different outputs from the respective image pickup tubes, an object part of low chroma needs to be selected as the condition of the local image area for establishing the registration. This signifies the extraction of a black-and-white object part within an image, but the part need not be a perfect black-and-white object. Even in the object of low chroma, the detection of the deviations of the respective colors is difficult in a part which has a little change in the direction of brightness, that is, in a picture part which changes gently. In order to detect the deviations, therefore, an object part which contains a large number of components of high spatial frequencies is desirable. Further, since an after image is inevitably involved in the image pickup tube, an object of fast movement is not favorable for detecting the misregistration.

For the above reasons, the requisites of the local image suitable for detecting the misregistrations from the video signal are (i) that the change of movement is little, (ii) that a sharp edge is included, and (iii) that the chroma is low. All objects being imaged do not satisfy these requisites. In the present invention, therefore, the outputs of the respective image pickup tubes are processed to decide a part in an image as meets the aforecited requisites, and the positional deviations of the respective outputs are detected from the signals of the selected local image.

DETAILED DESCRIPTION OF THE PREFERRED EMBODIMENTS OF THE INVENTION

Hereunder, embodiments of this invention will be described in detail.

Figure 1:
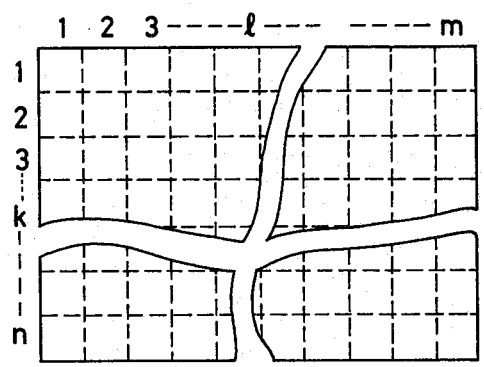
FIG. 1 is a schematic diagram showing an example of allotment of addresses in an effective scanning area, the addresses being used when a local image area is decided in this invention.
Figure 2:
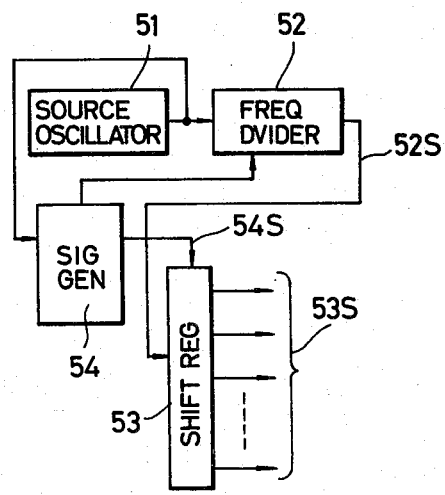
FIG. 2 is a block diagram of a circuit for generating address pulses in this invention.
Figure 3:
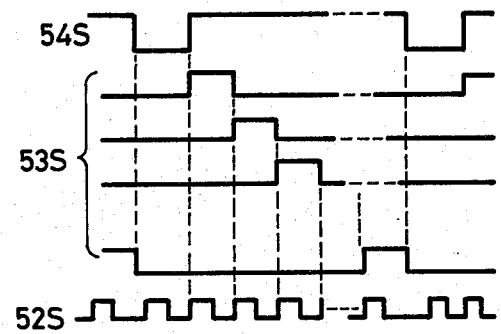
FIG. 3 is a waveform diagram of signals in the circuit of FIG. 2.

As illustrated in FIG. 1, the effective scanning time of television is divided by m in the lateral direction and by n in the vertical direction, to allot (m×n) addresses within the whole screen. Whether or not the three requisites previously described are met, is decided at every address. Gate pulses which are necessary for extracting images corresponding to the respective addresses are generated by a circuit shown in FIG. 2. Pulses from a source oscillator 51 of a camera have their frequency divided by means of a frequency divider 52, to select a frequency division ratio for dividing the effective scanning time by m. In the present-day standard format, by setting the source oscillation frequency at 14.3 MHz and the frequency division ratio at 35 by way of example, gate pulses which have a pulse width of about 2.45 μs are obtained, and the horizontal effective scanning period (about 52 μs) can be divided by 21. The output 52S of the frequency divider 52 is applied to a shift register 53 of m bits as the operating clock thereof. When the shift register 53 is supplied with a start pulse 54S which is synchronous with horizontal synchronizing pulses generated from a synchronizing signal generator 54, gate pulses corresponding to the addresses in the horizontal direction as shown at waveforms 53S in FIG. 3 can be formed. The frequency divider 52 is reset every horizontal period.

Now, description will be made of a method for deciding the three requisites at every address. The relations with the gate pulse generator circuit in FIG. 2 will be described later.

Figure 4:
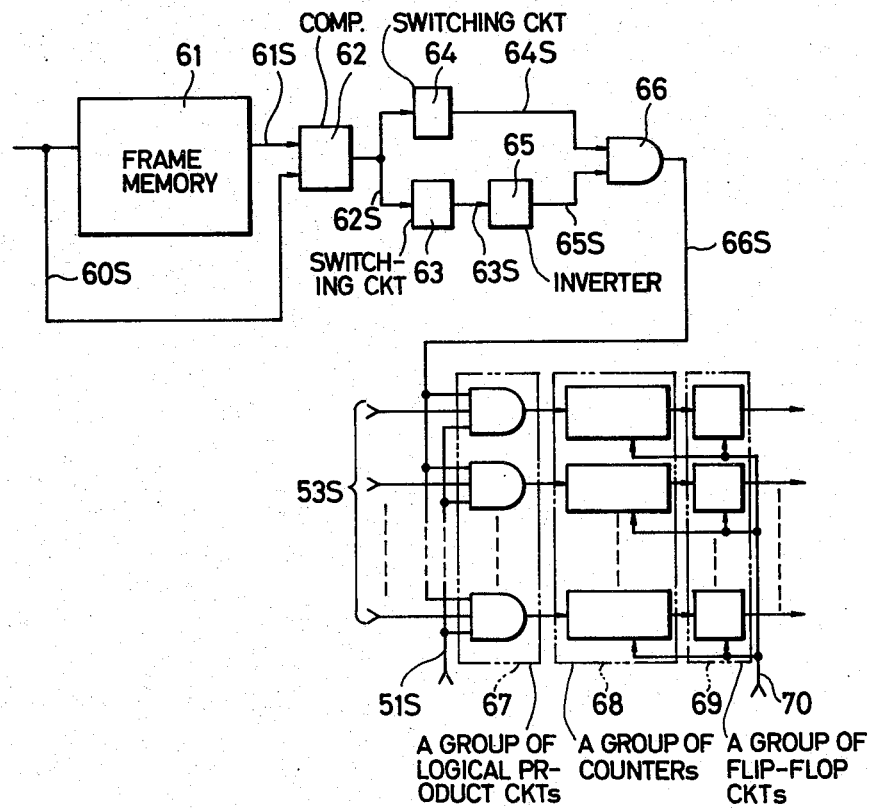
FIG. 4 is a block diagram of a circuit for deciding the address of an image moving little as concerns the image of a local area.
Figure 5:
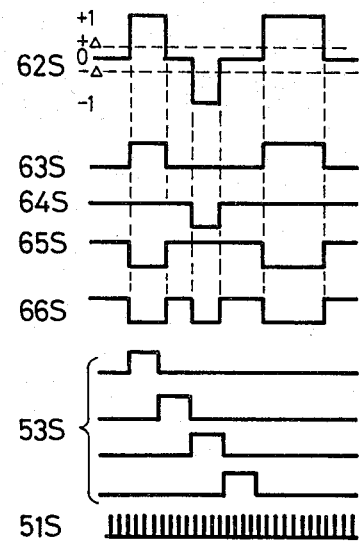
FIG. 5 is a waveform diagram of signals in the circuit of FIG. 4.

A circuit which extracts an address including an image having no movement, which forms the first requisite, will be explained with reference to a block diagram and a signal waveform diagram which are shown in FIGS. 4 and 5. This circuit is constructed of a frame memory 61 for storing the information of a preceding frame, a comparator circuit 62, a pulse circuit for shaping a comparison output signal, and a group of counters for storing decided information. A signal of the preceding one frame is stored in the frame memory 61. The memory 61 has a present-time picture information written thereinto simultaneously with the readout of the stored information. The video signal to be applied may be any one of the signals R, G, B and Y (luminance), but the use of the G signal or Y signal having a great luminance component is recommended. When the applied input signal 60S and the signal of the preceding one frame 61S read out from the frame memory 61 are compared by the comparator 62, a signal 62S is provided as "0" in the presence of the correlation of the present frame with the preceding frame and as ±"1" in the absence thereof. This signal 62S is applied to a switching circuit 63 and is switched by a level $+\Delta$ higher than the 0 (zero) potential, to become a signal 63S. Similarly, the signal 62S is applied to a switching circuit 64 and is switched by a level $-\Delta$ into a signal 64S. The signal 63S is inverted by an inverter 65 into a signal 65S, which has its logical product with the signal 64S by a logical product circuit 66 and becomes a signal 66S. In the signal 66S, the level of "1" indicates a place where the correlation with the preceding frame exists, while the level of "0" indicates a position where it does not exist.

In order to extract the address including the image free from movement, the logical products between the signal 66S and the gate pulses corresponding to the addresses may be taken, whereupon a suited time may be measured. In order to measure the time, the number of reference pulses within a gate pulse width corresponding to the address may be measured. When such operation for one horizontal scanning line is repeated the number of lines corresponding to the addresses in the vertical direction, the area of a part satisfying the requisite within the address is measured. Since the area of the address is known, whether or not the particular address wholly satisfies the requisite can be discriminated. In the circuit of FIG. 4, the logical products among the output signal 66S of the logical product circuit 66, the address gate pulses 53S explained with reference to FIG. 2 and the reference pulses 51S provided from the source oscillator of the camera are taken by a group of logical product circuits 67 corresponding to the respective addresses. The circuit group 67 includes m logical product circuits in correspondence with the number m of the addresses allotted in the horizontal direction. The respective outputs of the group of logical product circuits 67 are applied to the group of counters 68, whereby the number of pulses corresponding to the areas are measured. The number of bits N of each counter is expressed as follows by letting $T_G$ denote the width of the gate pulse 53S, $T_S$ denote the period of the reference clock pulses 51S and a (lines) denote the number of scanning lines in the vertical direction for the respective addresses:

$$N = T_G/T_S \times a$$

In the case where the whole area conforms with the first requisite, a carry signal is provided from the counter. Such carry signals are applied to a group of flip-flop circuits 69, and the flip-flops of the conforming addresses are inverted to provide "1". The group of counters 68 and the group of flip-flop circuits 69 are cleared by a clear pulse 70 every a-th scanning line, that is, every address in the vertical direction. The output signals of the flip-flop circuits 69 are latched in succeeding circuits within a horizontal blanking time before they are cleared. The timing relations of this operation will be described in detail later.

Figure 7:
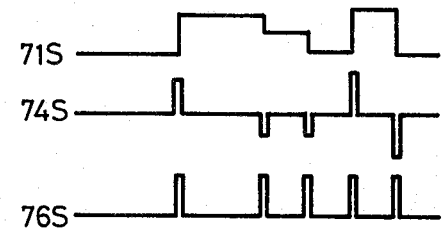
FIG. 7 is a waveform diagram of signals in the circuit of FIG. 6.
Figure 6:
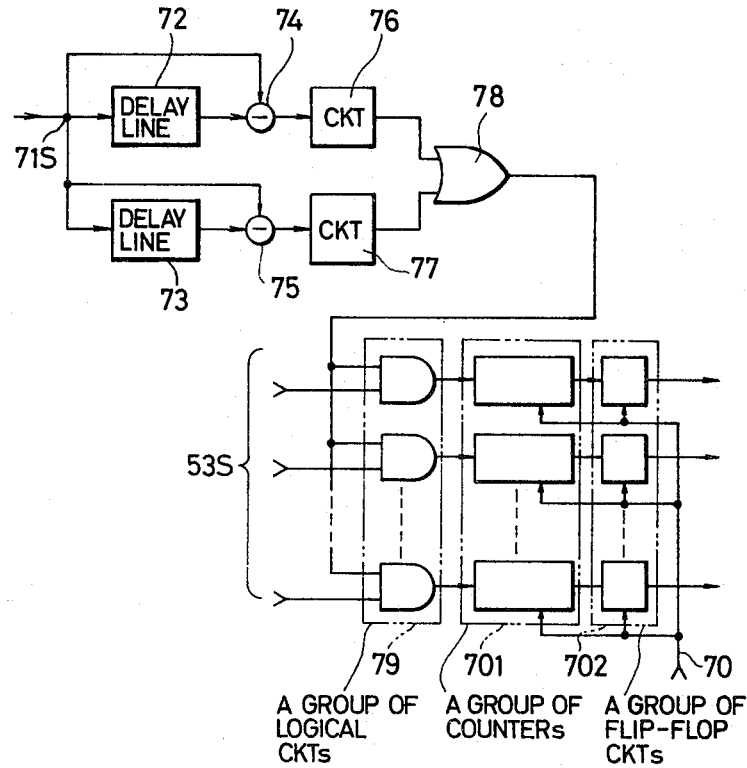
FIG. 6 is a block diagram of a circuit for selecting the image of a local area having a sharp contour.

Subsequently, an example of a circuit which extracts a picture part including a large number of sharp edges, which forms the second requisite, will be described with reference to FIGS. 6 and 7. This circuit includes a delay line 72 for delaying an input signal 71S several tens—several hundred nanoseconds, a delay line 73 for delaying the input signal 71S one horizontal scanning period, and subtracter circuits 74 and 75 for taking the differences between the respective delayed outputs and the input signal 71S. Likewise to a conventional contour correction circuit, this circuit portion can extract the edge part of a TV picture. Edges in the horizontal direction are derived from the subtracter circuit 74, while edges in the vertical direction are derived from the subtracter circuit 75. Assuming now that the input signal has been applied as illustrated by a waveform 71S in FIG. 7, a waveform 74S shown in FIG. 7 is provided from the output terminal of the subtracter circuit 74. That is, a rise part becomes positive, and a fall part becomes negative. Using a circuit 76, the pulses having the positive and negative directions are converted into unidirectional pulses as shown at 76S in FIG. 7. Likewise, the output of the subtracter circuit 75 is converted into unidirectional pulses by the use of a circuit 77. These circuits 76 and 77 may be similar to the circuits (63, 64, 65 and 66 in FIG. 4) used when the movement of the picture is detected. The output signals of the converter circuits 76 and 77 are added by a logical sum circuit 78, and the numbers of the resulting output pulses within the respective addresses are measured by a decision circuit. Then, the address including many edges can be found out. The decision circuit is similar in arrangement to that of the circuit for selecting the address free from movement as explained with reference to FIG. 4. Herein, however, a group of logical product circuits 79 consist of 2-input circuits which take the logical products between the output of the logical sum circuit 78 and the address gate pulses 53S. The number of bits A of each counter in a group of counters 701 may be appropriately selected according to a design. The operation of this circuit portion is similar to that in FIG. 4. In addresses having many edges ($\geq A$ in terms of the number of pulses), the corresponding flip-flops in a group of flip-flop circuits 702 are inverted, so that their outputs indicate "1".

Figure 8:
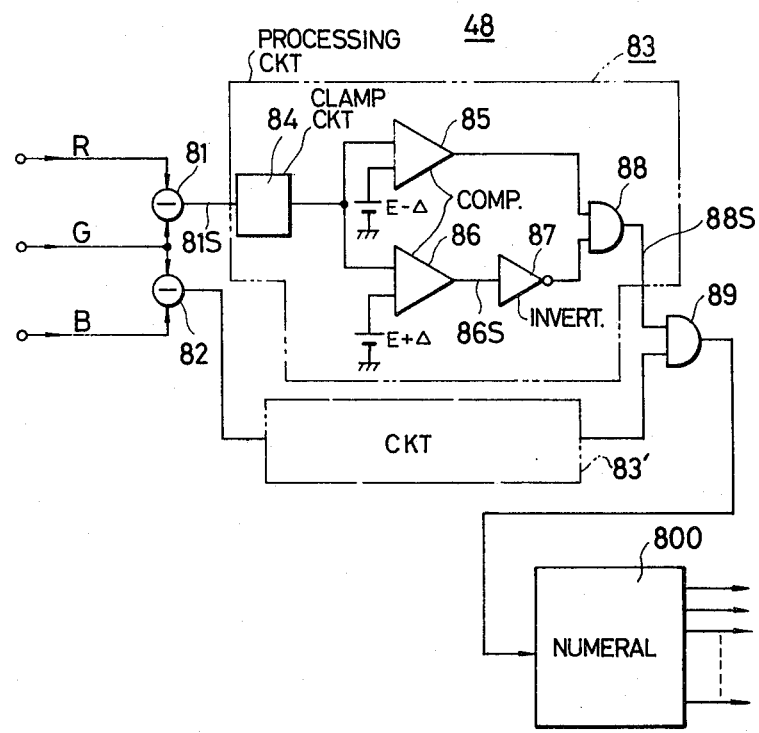
FIG. 8 is a block diagram of a circuit for selecting the image of a local area having a low chroma.
Figure 9:
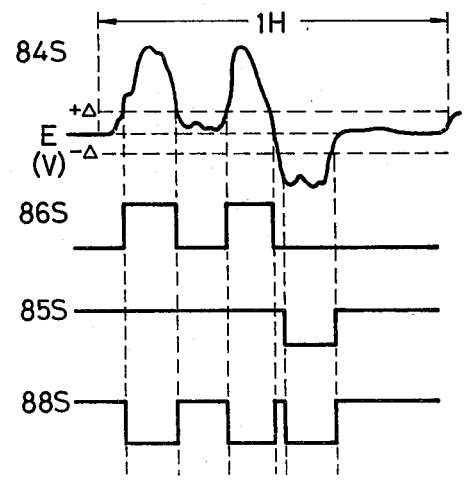
FIG. 9 is a waveform diagram of signals in the circuit of FIG. 8.

Subsequently, a specific example of a circuit for detecting the third requisite or a part of low chroma will be described with reference to FIGS. 8 and 9. The respective signals R, G and B are adjusted so that outputs may become 1:1:1 when a black-and-white object is imaged (white balance). The signals R, G and B are applied to subtracter circuits 81 and 82 as indicated by arrows, to form color-difference signals (G−R) and (G−B). Since the color-difference signals are subjected to similar processings by circuits 83 and 83', only the processing circuit 83 for the signal (G−R) will be explained here. The color-difference signal 81S of (G−R) is D.C.-regenerated by a clamp circuit 84, and is D.C.-fixed to E (V) as illustrated by a waveform 84S in FIG. 9. When the resulting signal is compared with a voltage being Δ higher than E (V) and a voltage being Δ lower than the same by means of comparators 85 and 86, signals as shown by waveforms 85S and 86S in FIG. 9 are obtained. The output 86S compared with (E+Δ) is inverted by an inverter 87, and then applied to an AND circuit 88 along with the output of the comparator 85. The output of the AND circuit becomes as shown by a waveform 88S in FIG. 9. In this waveform, the level "1" represents a part of low saturation degree within a picture, while the level of "0" represents a part high saturation degree. The color-difference signal (G−B) is similarly processed by the circuit 83', and the logical product between both the outputs is taken by an AND circuit 89. Thus, picture parts of low saturation degree (G≈B≈R) can be discriminated on the basis of the output pulses of the AND circuit 89. A method for extracting the conforming addresses from the pulses can be so arranged that, quite similarly to the case of detecting the movements, the flip-flop circuits of the conforming addresses are inverted to indicate outputs "1". Here, a circuit therefor is indicated at numeral 800, and the details are omitted.

As described above, it is possible to detect the address free from the movement of a picture, the address with many edges and the address of low saturation degree as are suited to the registration adjustment. Now, the entire construction of a camera system according to this invention in which the detector circuits are combined will be described with reference to FIG. 10.

Figure 10:
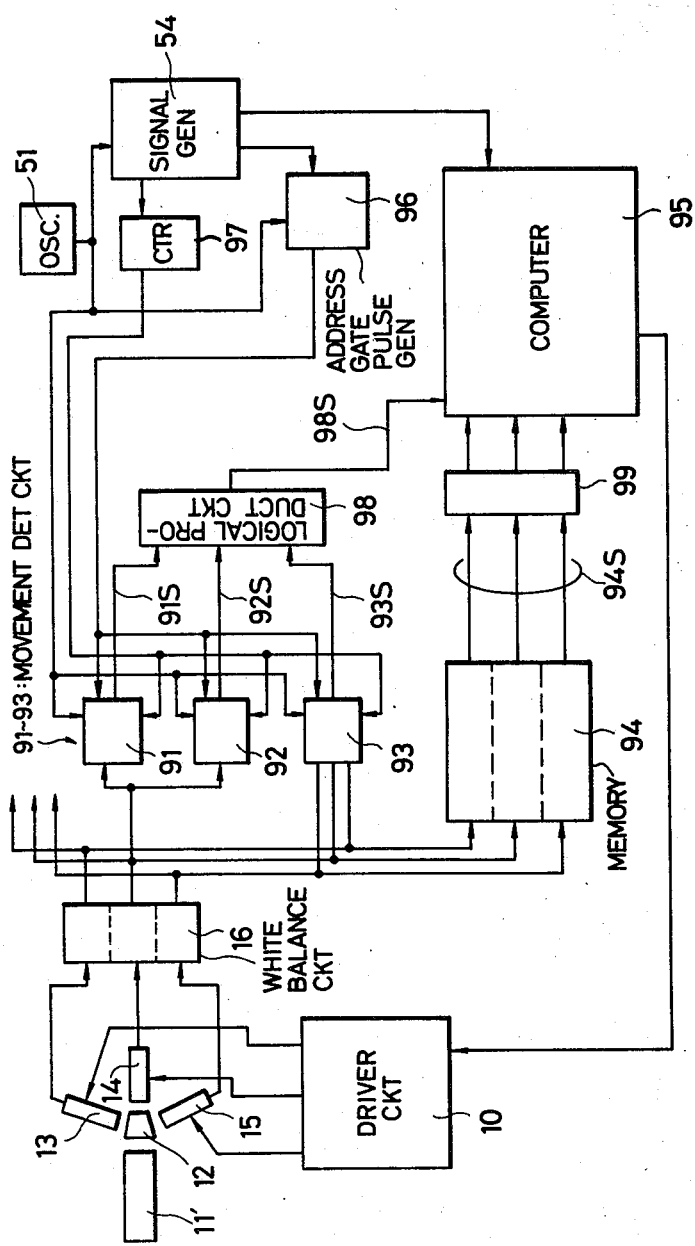
FIG. 10 is a block diagram showing an embodiment of the whole arrangement of this invention.

In FIG. 10, light from a taking lens 11' is decomposed into the primary colors R, G and B by a three-color separating optical system 12, and the color components are respectively focused on the target planes of corresponding image pickup tubes 13, 14 and 15. Each image pickup tube is encased in a coil assembly which includes a deflection coil, a focusing coil, an alignment coil etc., and which is operated by a driver circuit 10 (including a deflection circuit, an alignment circuit and a centering circuit). The construction of this portion is the same as in the presetting auto-setup type camera in the prior art.

In order to generate a video signal, the color camera includes in addition to the aforecited circuit portion, a high voltage circuit, a beam blanking circuit, a preamplifier circuit, a white balance circuit, a processing circuit, an encoder circuit, a synchronizing signal generator circuit, a source oscillator, etc. The outputs of the image pickup tubes are amplified by the preamplifiers and then have the white balance established, whereupon the resulting signals are subjected to waveform processings by means of the processing circuit. Since, however, circuit parts closely relevant to the present invention are the white balance circuit 16, the source oscillator 51 and the synchronizing signal generator 54, only these circuits are illustrated and the other circuit parts are omitted in FIG. 10.

Usually, in the camera, the gains of the respective amplifiers are adjusted by the white balance circuit 16 so that the respective signals R, G and B may become equal with respect to a black-and-white object. The white-balanced G signal is applied to each of the movement detector circuit explained with reference to FIG. 4 (denoted by numeral 91 in FIG. 10), the edge detector circuit explained with reference to FIG. 6 (denoted by numeral 92 in FIG. 10) and the low-chroma-part detector circuit explained with reference to FIG. 8 (denoted by numeral 93 in FIG. 10). The R and B signals are applied to only the low-chroma-part detector circuit 93. In addition, the respective signals R, G and B are applied to a memory 94 which can store them in correspondence with a lines. This memory 94 may be a delay line of serial-in/serial-out type. That is, it may be of the type which loads the signals at the same time that they are read out. As regards the standard format, it may be a delay line of a·H ($=63.5 \times a$ μS). The signals delayed a·H are digitized by an analog-to-digital (A/D) converter 99, whereupon the digitized signals are applied to a computer 95. The gate pulses from the address gate pulse generator explained with reference to FIG. 2 (96 in FIG. 10) are applied to each of the movement detector circuit 91, the edge detector circuit 92 and the low-saturation-degree-part detector circuit 93. The output of the source oscillator 51 is applied to the synchronizing signal generator 54 and the respective condition detector circuits 91, 92 and 93. A reset pulse for resetting every a-th line is obtained by measuring the horizontal driving pulses of the synchronizing signal generator 54 by means of a counter 97. Also this reset pulse is applied to the respective condition detector circuits 91, 92 and 93. The computer 95 for controlling the camera apparatus of this invention is supplied with pulses from the synchronizing signal generator 54, and it executes control operations in synchronism with the pulses.

Figure 11:
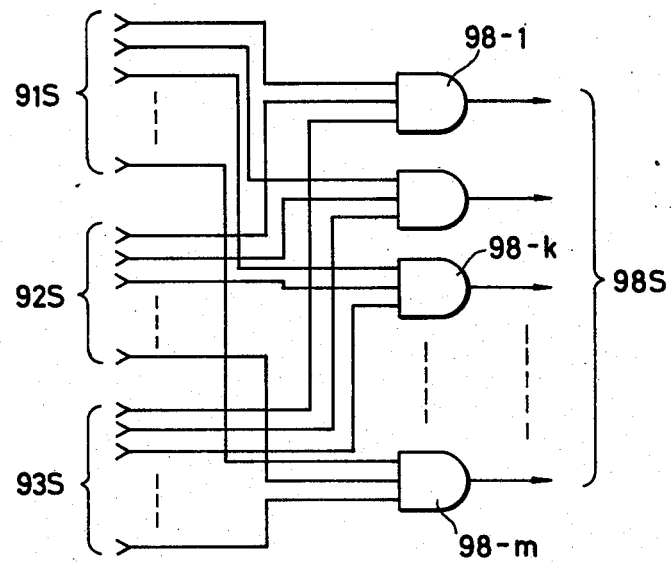
FIG. 11 is a diagram showing an example of a circuit for taking the logical products of predetermined conditions concerning this invention.

The decision pulse outputs 91S, 92S and 93S of the respective address requisite detector circuits 91, 92 and 93 are applied to a group of logical product circuits 98. As shown by way of example in FIG. 11, the group of logical product circuits 98 consist of that number of 3-input logical product circuits 98-k which is equal to the number m of the addresses in the horizontal direction, and each circuit 98-k takes the logical product of the decision pulses 91S, 92S and 93S of the identical address. Accordingly, the logical product circuit 98-k provides "1" when the image of the address k satisfies all the three requisites, and it provides "0" even when only one requisite is not met. A group of output signals 98S from the group of logical product circuits 98 are applied to the computer 95. In every a·H-th horizontal blanking period before which the decision results of the m addresses are provided, the signals 98S are latched and are loaded into a memory within the computer 95. Subsequently, among the signals 94S delayed a·H, only those corresponding to the addresses which fulfill the three requisites, in other words, the addresses in which the signals 98S are "1" are stored into the internal memory. The computer 95 calculates misregistrations on the basis of the sampled signals, and feeds a control signal back to the image pickup tube-driver circuit 10.

Figure 12:
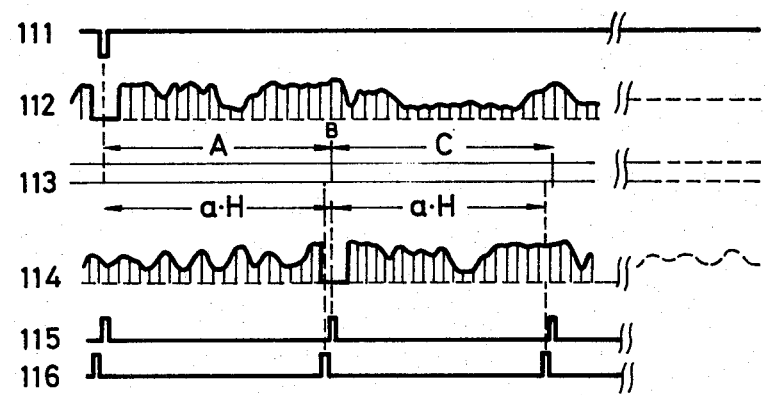
FIG. 12 is a time chart of the apparatus of this invention.

FIG. 12 shows a time chart of control operations in the camera apparatus described above.

Referring to FIG. 12, numeral 111 indicates a vertical synchronizing pulse, and numeral 112 the output signal of the camera. Numeral 114 denotes the signals delayed a·H by the memory 94, numeral 115 the clear pulse generated every a·H, and numeral 116 a latch pulse which is generated from the computer 95 before the clear and whose timing is used to decide the conforming address. The pulses 115 and 116 are generated in the horizontal blanking period. More specifically, the conforming addresses are detected by the respective requisite detector circuits in a section A of a waveform 113, and the corresponding decision results are known at a point B. The computer 95 reads the results, and loads thereinto only the image signals of the conforming addresses on the basis of the signals 114 delayed a·H in a section C. Thereafter, such operations are similarly repeated over the whole screen. The loaded image signals are used to calculate the misregistrations in the computer, and the resulting control signal is fed back to the image pickup tube-driver circuit 10. The timing of the feedback is dependent upon the operation processing time of the computer. In this case, it is desirable that the misregistrations can be corrected within one frame. It is to be understood, however, that even when the timing of the feedback to the driver circuit 10 lags several frames, no inconvenience occurs. In the latter case, a program may be so set that as regards the addresses being presently calculated, the next signals are not loaded until the feedback is applied thereto.

Figure 13:
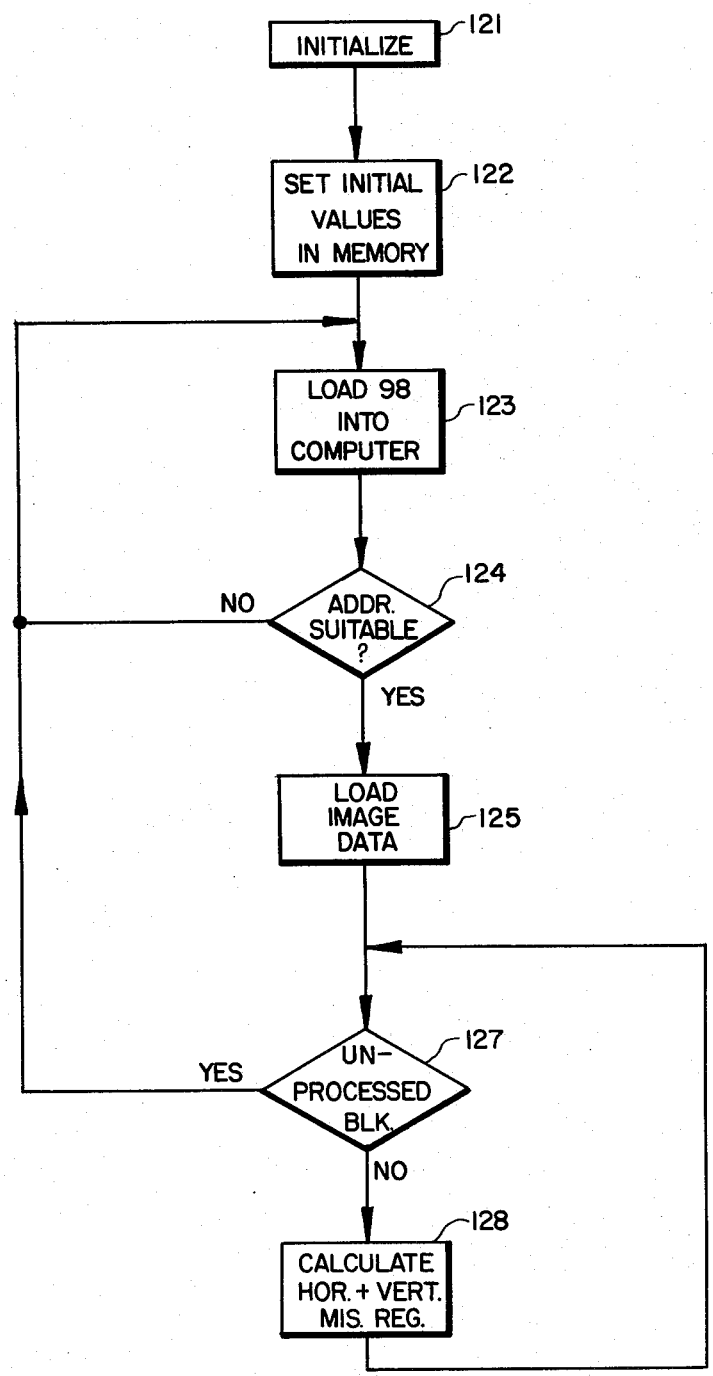
FIG. 13 is a flow chart of the apparatus of this invention.

FIG. 13 shows a schematic operating flow chart of the computer. Referring to the figure, numeral 121 designates an initialize routine, which starts in response to a signal input from a switch that operates upon closure of the power supply of the camera. Numeral 122 designates a routine for affording the initial values of the registrations of the respective addresses to a correction value memory. The values may be set at predetermined reference values, or the final registration values during the preceding operation may well be stored in a nonvolatile memory or the like and then used. A routine 123 is a control signal output routine for loading the computer with the outputs from the group of logical product circuits 98, while a routine 124 is a routine for deciding whether or not the address suited to the registration exists, on the basis of the signals latched in the computer. In the absence of the suited address, the operating flow returns to the routine 123, and the provision of the requisite detection results 98S of the next row is awaited. In the presence of the suited address, the operating flow proceeds to a routine 125, in which among the R, G and B signals delayed a·H by and delivered from the memory 94, the image data corresponding to the suited addresses are loaded into the memory of the computer. The computer 95 is equipped with the memory in which the image data corresponding to the m addresses as provided from the memory 94 are stored for the respective colors R, G and B. When such capacity is not available, a memory capable of storing data corresponding to one address suffices. Numeral 127 designates a routine which decides the presence or absence of an unprocessed data block among the image data written in the internal memory. Now, when the suited image data have just been loaded, the operating flow proceeds to the next routine 128. In the routine 128, a horizontal misregistration and a vertical misregistration are calculated from the picture information R, G and B of one address suited to the requisites as stored in the memory, and the control signals for corrections are delivered to the driver circuit 10 of the R, G and B image pickup tubes on the basis of the calculated results.

When the corrections of the misregistrations on one address have ended, the operating flow returns to the routine 127. In the presence of an unprocessed address, similar correction processings are carried out in the routine 128 again. If the operating processings have ended on the data of all the suited addresses loaded in the internal memory, the routine 127 returns to the routine 123, and the provision of the next requisite detection results 98S is awaited.

According to the control flow, until the end of the corrections of the misregistrations corresponding to one row in the horizontal direction as are made by the routines 127 and 128, the decision data 98S of the next row as provided from the circuitry 98 are ignored, and the next misregistration corrections beginning with the routine 123 are made from the row which is being scanned upon the end of the correction processings. Accordingly, the row in which the routine 123 operates shifts in the screen in succession with the advance of the processings, with the result that the misregistration corrections are made as to the whole screen. However, the control flow of FIG. 13 is a mere example of the control of the camera apparatus of this invention, and various modifications are possible. For instance, correcting operations can be frequently executed in places of high correction effect in such a way that the data sampling addresses for the misregistration corrections are limited in accordance with horizontal or vertical positions in advance and that the correcting operations are made only when the requisites have held in the addresses. In order to perform correcting operations on the average over the entire screen, the range of the next row to be corrected may well be specified in accordance with corrected rows. A certain memory capacity and data processing speed of the computer permit a program operation in which the loading of data and the decision processings of misregistrations are executed in parallel.

As set forth above, with the present invention, a picture suited to the registration is normally selected from within a screen, and the registration adjustments are made by the use of the extracted picture. Therefore, a high picture quality can be held at all times so as to normally correspond to the variation of the operating state of the camera. This is very greatly effective.

We claim:

1. A color imaging apparatus comprising means including a plurality of image pickup tubes for imaging respective primary colors separated from an optical image of an object, adjusting means for adjusting the relative positional relations of the images of said respective image pickup tubes, decision means for detecting on a frame by frame basis those image signals from among a frame of image signals from said image pickup tubes that relate to a selected local area of said image which satisfy a predetermined requisite, storage means for temporarily storing the image signals detected by said decision means, and means for controlling said adjusting circuit by the use of said image signals stored in said storage means.

2. A color imaging apparatus as defined in claim 1, wherein said decision means includes a circuit which detects image signals concerning a selected local area of the image which is free from movement.

3. A color imaging apparatus as defined in claim 1, wherein said decision means includes a circuit which detects image signals indicating that the image contour of said selected local area is sharp.

4. A color imaging apparatus as defined in claim 1, wherein said decision means includes a circuit which detects image signals indicating that the chroma of an image of said selected local area is low.

5. A color imaging apparatus comprising means including a plurality of image pickup tubes for imaging respective primary colors separated from an optical image of an object, adjusting means for adjusting the relative positional relations of the images of said respective image pickup tubes, decision means for detecting on a frame by frame basis those image signals from said image pickup tubes relating to a selected local area of said image which is free from movement, has a sharp contour and exhibits a low chroma, storage means for temporarily storing the image signals detected by said decision means, and means for controlling said adjusting circuit by the use of said image signals stored in said storage means.

6. A color imaging apparatus as defined in claim 5, wherein said decision means includes a circuit which detects image signals concerning a selected local area of the image which is free from movement, comprising
    frame memory means connected to receive the output from at least one of said image pickup tubes for storing a frame of image data;
    comparison means connected to said frame memory means for comparing the image data received from said one image pickup tube with the image data stored in said frame memory means to compare the values of the image signals representing corresponding selected local areas of successive frames of said image data;
    address generation means for generating address timing pulses in time with the scanning of successive selected local areas of the optical image for each frame of image data by said pickup tubes; and
    detecting means connected to said comparison means and said address generation means for detecting when a selected local area of the image is free from movement on the basis that the image signal for that selected local area has not changed in value from one frame to the next by more than a predetermined amount and for enabling said storage means in response thereto.

7. A color imaging apparatus as defined in claim 6, wherein said comparison means includes means for generating a pulse whenever the current image signal from said pickup tube and the stored image signal from said frame memory means to deviate by a predetermined amount.

8. A color imaging apparatus as defined in claim 7, wherein said detecting means includes a source of high frequency pulses, gating means including a plurality of gates connected to said address generation means or producing pulse outputs representing the product of said high frequency pulses and said pulses from said comparison means for each address timing pulse, means including a plurality of counters connected to respective ones of said gates for counting the output pulses from said gates, and means connected to said counters and said storage means for producing a respective output for each counter which reaches a predetermined count indicating a predetermined degree of freedom of movement of the selected local area of the image corresponding thereto.

9. A color imaging apparatus as defined in claim 7, wherein said detecting means includes a source of high frequency pulses, gating means including a plurality of gates connected to said address generation means for producing pulse outputs representing the product of said high frequency pulses and said pulses from said chroma level detection means for each address timing pulse, means including a plurality of counters connected to respective ones of said gates for counting the output pulses from said gates, and means connected to said counters and said storage means for producing a respective output for each counter which reaches a predetermined count.

10. A color imaging apparatus as defined in claim 5, wherein said decision means includes a circuit which detects image signals indicating that the image contour of said selected local area includes a number of sharp lines, comprising:
   edge detector means connected to receive the output from at least one of said pickup tubes for generating a pulse whenever the image contour of said selected local area represents a sharp line in at least one of the scanning directions of said one pickup tube;
   address generation means for generating address timing pulses in time with the scanning of successive local areas of the optical image data by said one pickup tube;
   a source of high frequency pulses;
   gating means including a plurality of gates connected to said address generation means for producing pulse outputs representing the product of said high frequency pulses and the pulses from said edge detector means for each address timing pulse;
   means including a plurality of counters connected to respective ones of said gates for counting the output pulses from said gates; and
   means connected to said counters and to said storage means for producing a respective output to said storage means for each counter which reaches a predetermined count indicating a number of sharp lines in said selected local area.

11. A color imaging apparatus as defined in claim 5, wherein said decision means includes a circuit which detects image signals indicating that the chroma of an image of said selected local area is low, comprising:
   chroma level detection means connected to receive the outputs of at least two of said pickup tubes for generating a pulse whenever the difference between said outputs of said pickup tubes is below a predetermined level;
   address generation means for generating address timing pulses in time with the scanning of successive selected local areas of the optical image data by said pickup tubes; and
   detecting means connected to said chroma level detection means and said address generation means for detecting when the chroma of a selected local area is below a predetermined level on the basis of the duration of the pulse produced by said chroma level detection means at the time the address timing pulse for that selected local area is generated and for enabling said storage means in response thereto.

12. A color imaging apparatus comprising means including a plurality of image pickup tubes for imaging respective primary colors separated from an optical image of an object, adjusting means for adjusting the relative positional relations of the images of said respective image pickup tubes, decision means for detecting on a frame by frame basis those image signals from said image pickup tubes relating to a selected local area of said image which is free from movement and exhibits a low chroma, storage means for temporarily storing the image signals detected by said decision means, and means for controlling said adjusting circuit by the use of said image signals stored in said storage means.

* * * * *